March 12, 1940.　　　E. M. SCHANTZ　　　2,193,648
WEIGHING SCALE

Filed March 26, 1934　　　9 Sheets-Sheet 1

Inventor:
Edwin M. Schantz

March 12, 1940. E. M. SCHANTZ 2,193,648
WEIGHING SCALE
Filed March 26, 1934 9 Sheets-Sheet 3

Inventor:
Edwin M. Schantz

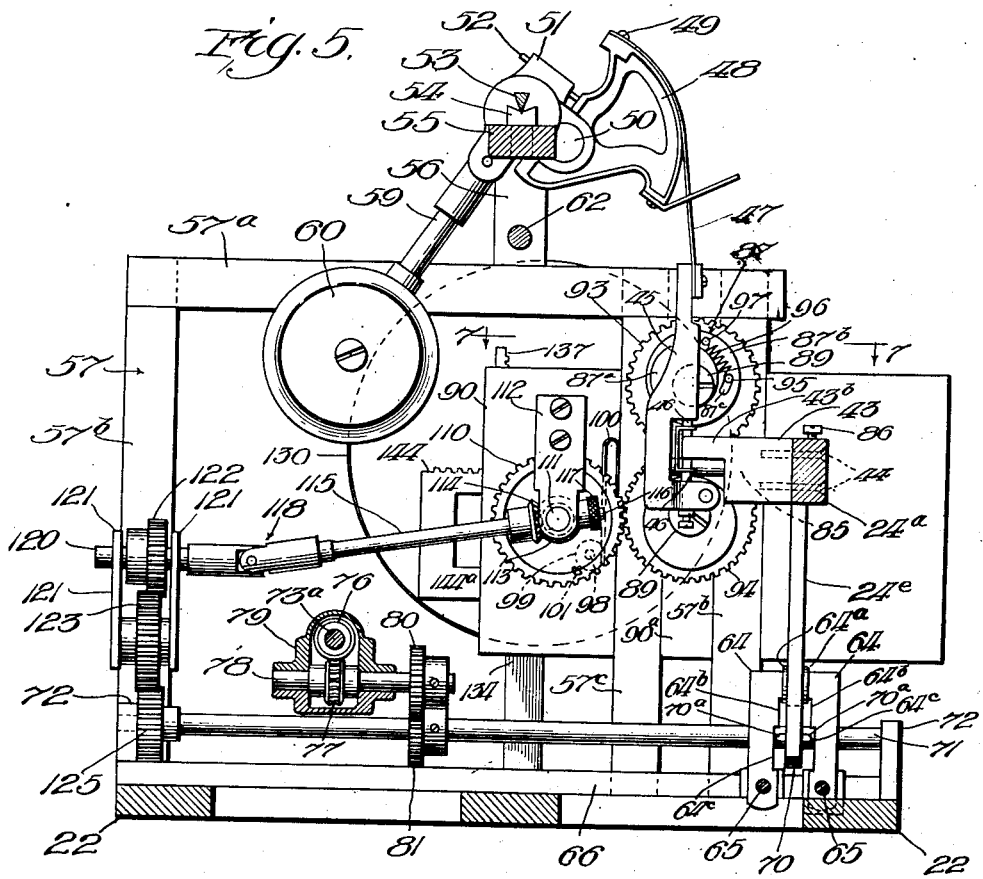

March 12, 1940.  E. M. SCHANTZ  2,193,648
WEIGHING SCALE
Filed March 26, 1934  9 Sheets-Sheet 5
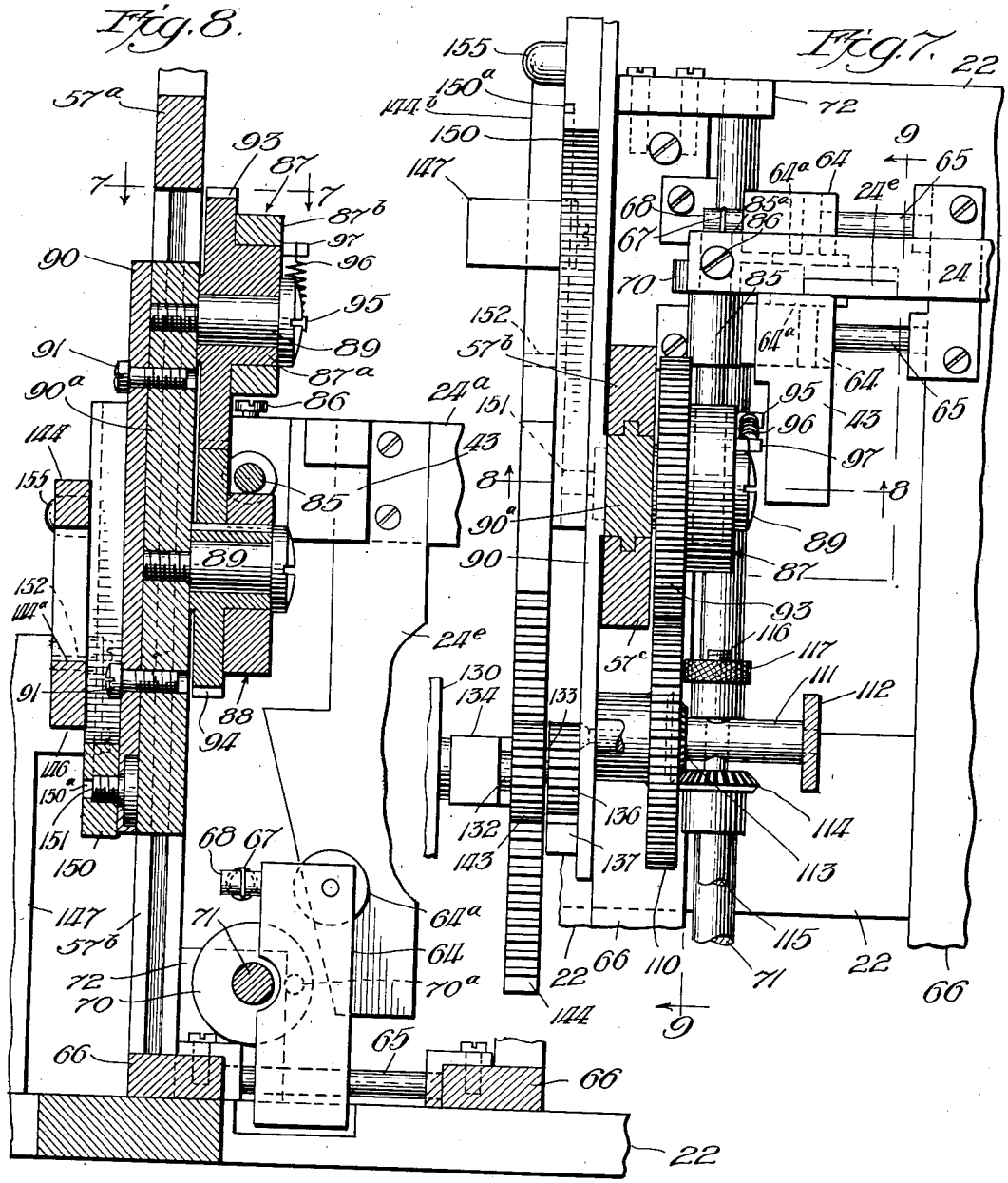
Inventor,
Edwin M. Schantz
By Rector, Hibben, Davis & Macauley,
Attys.

March 12, 1940.  E. M. SCHANTZ  2,193,648
WEIGHING SCALE
Filed March 26, 1934  9 Sheets-Sheet 6
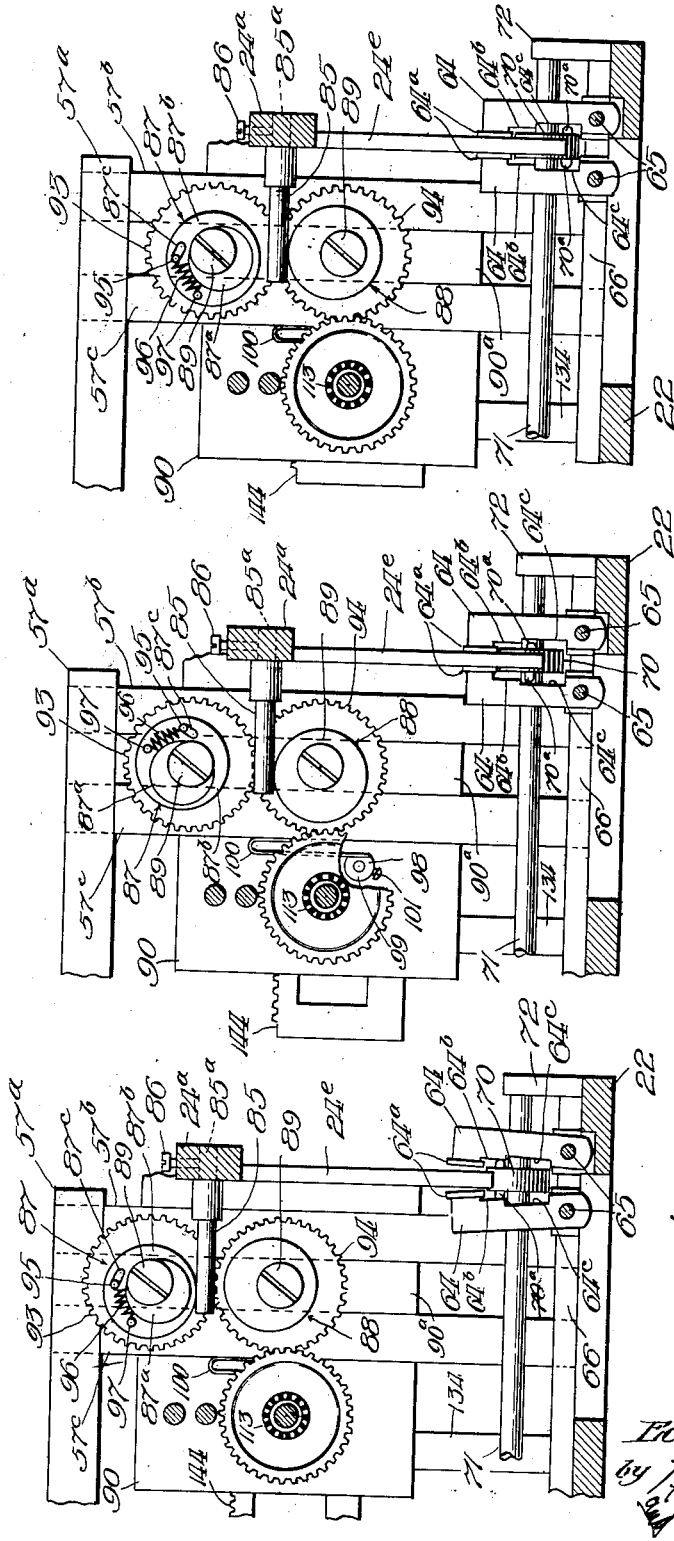

March 12, 1940.                E. M. SCHANTZ                 2,193,648
                               WEIGHING SCALE
                          Filed March 26, 1934           9 Sheets-Sheet 7
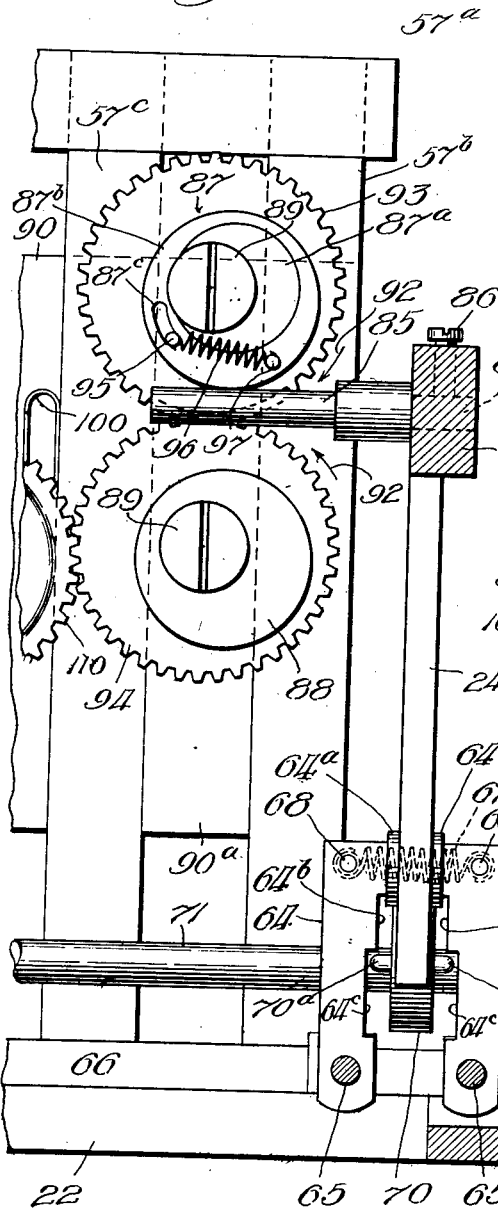
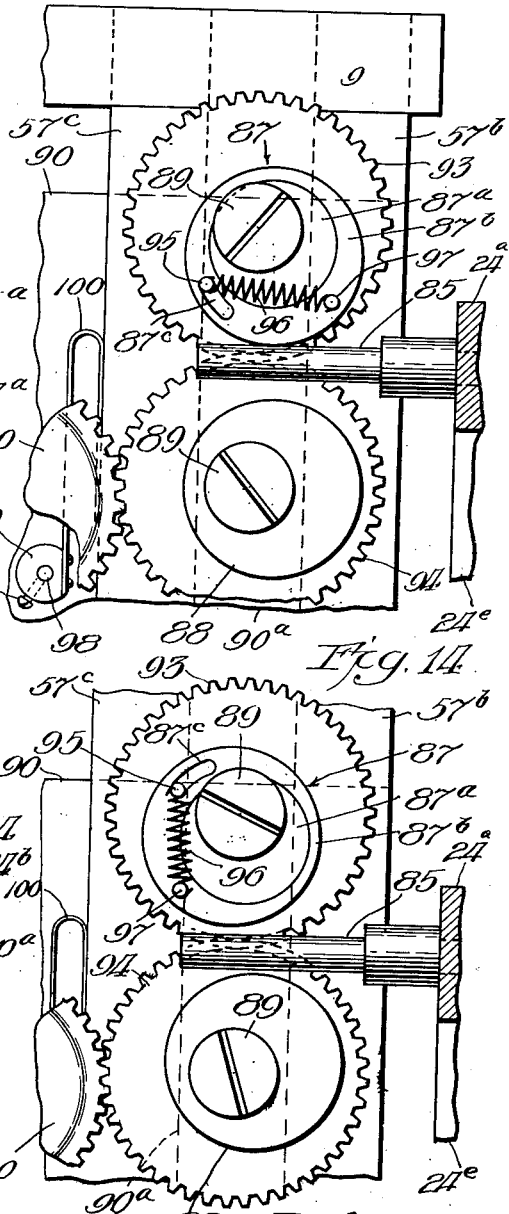

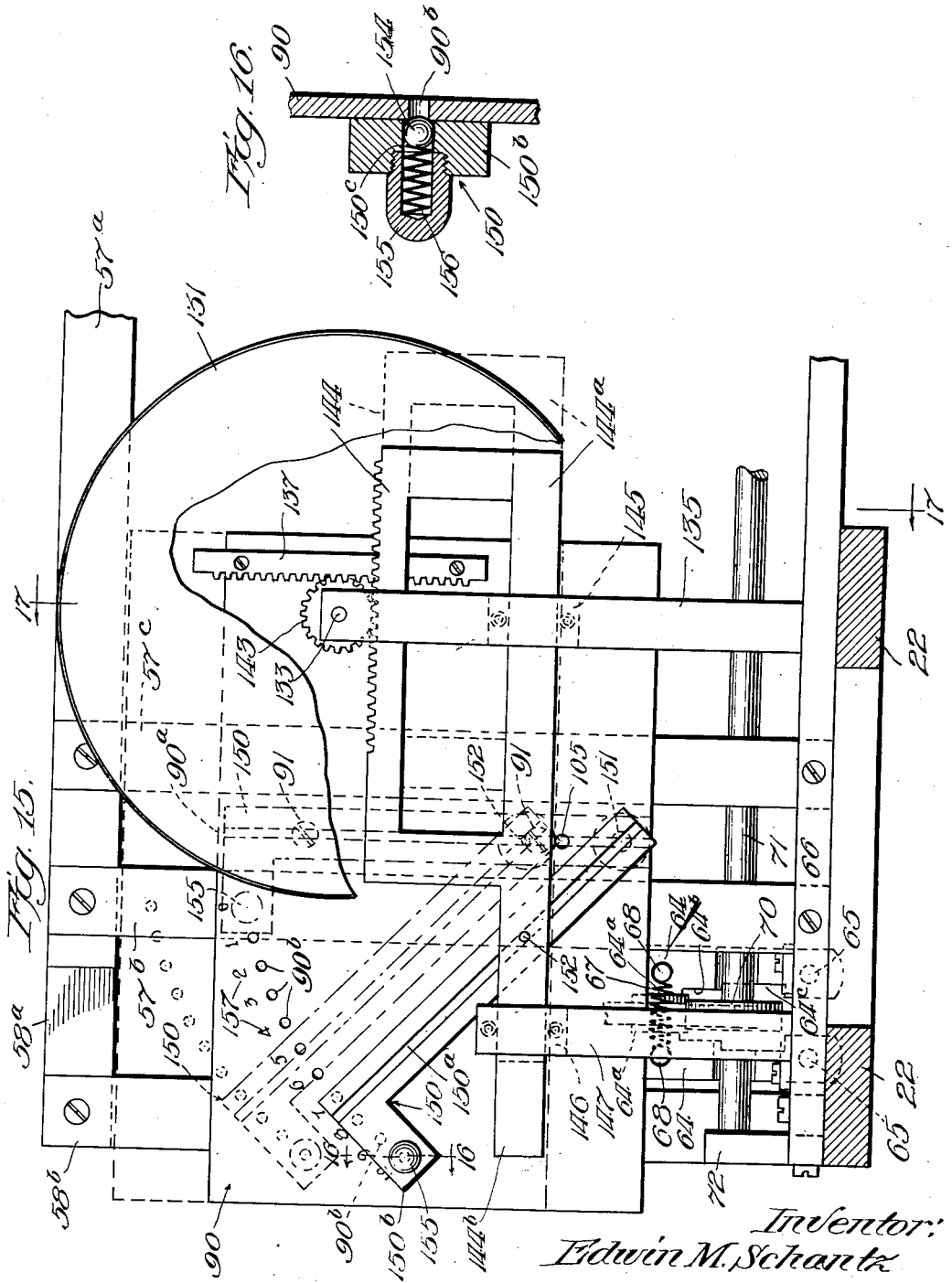

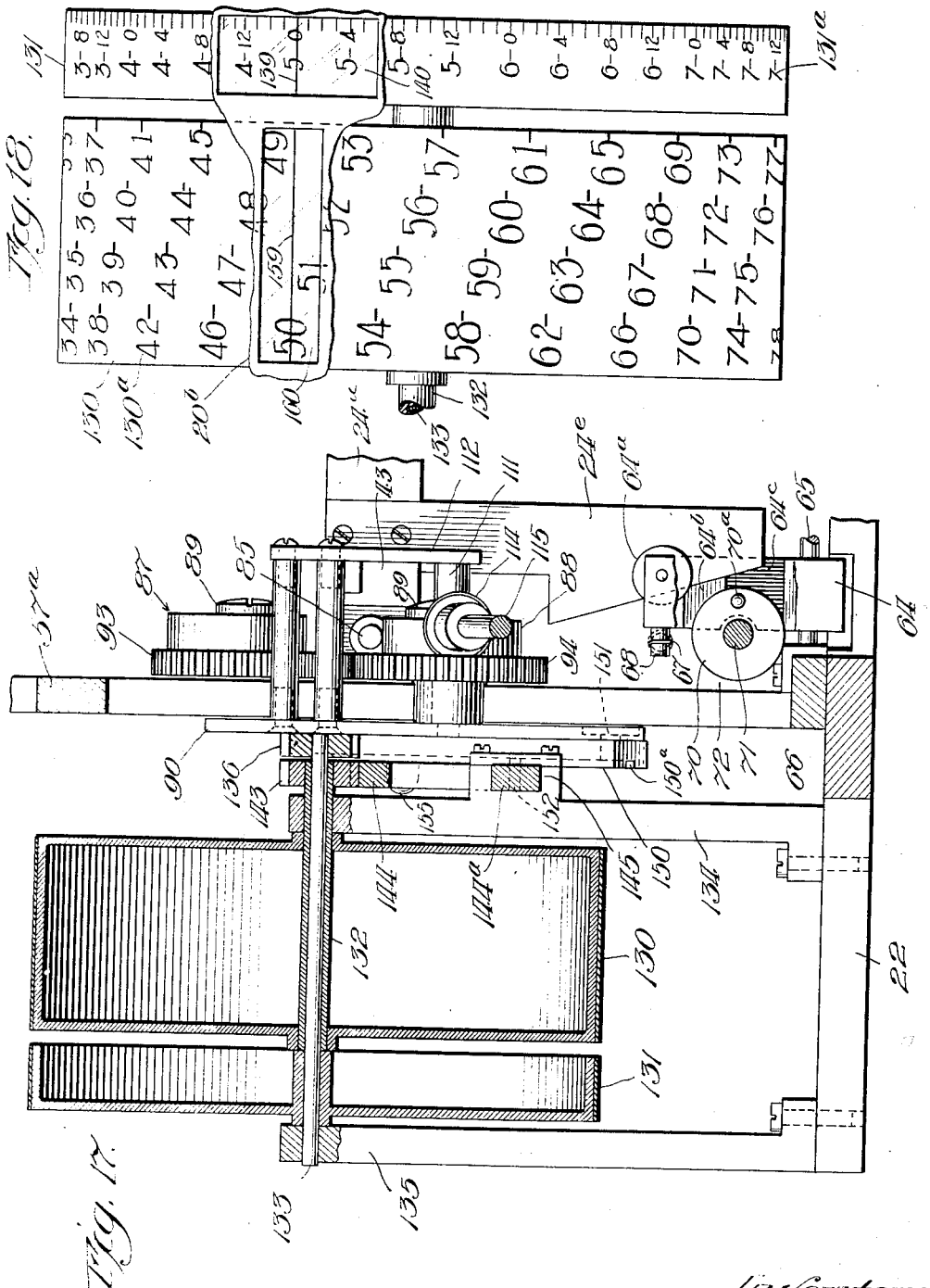

Patented Mar. 12, 1940

2,193,648

UNITED STATES PATENT OFFICE 2,193,648

WEIGHING SCALE

Edwin M. Schantz, Dayton, Ohio, assignor to Toledo Scale Manufacturing Company, Toledo, Ohio, a corporation of New Jersey Application March 26, 1934, Serial No. 717,367

20 Claims. (Cl. 265—5)

This invention relates to improvements in weighing scales and its purpose is to provide improved weighing mechanism by which the weight of an object can be more accurately determined than with the use of any of the forms of scales heretofore known in which some form of indicating or computing mechanism has been employed for indicating the weight.

In the weighing scales of the prior art, a portion of the energy represented by the load on the scale has been employed for actuating the indicating, computing or recording mechanism of the scale or for actuating some part by which that mechanism has been put in motion and the energy thus employed for actuating purposes has lessened the weight indicated or recorded and thus introduced into the weighing operation an error of greater or lesser magnitude, depending upon how much of the energy of the load has been thus consumed.

The principal object of the present invention is to overcome the above mentioned difficulties by providing a novel form of weighing mechanism in which the weight is indicated, computed or recorded without consuming any of the energy transmitted by the load to the weighing mechanism. A further object of the invention is to provide an improved scale in which the positions assumed by a movable part of the scale in response to the load placed on the scale is recorded while that part is at rest and locked against movement so that no part of the energy transmitted by the load is conveyed to the recording mechanism. Still another object of the invention is to provide a scale comprising weighing mechanism responsive to the load and having a movable member adapted to move a distance proportional to the weight on the scale, in combination with means for intermittently locking said member against movement and means for periodically recording the position of said member while it is so locked against movement. Another object of the invention is to provide a scale having a member movable in response to the load on the scale in combination with separate power driven means for periodically locking said member against movement and separate power driven means for actuating recording or computing mechanism and periodically recording the position of said member in unison with the operation of said locking means. A further object of the invention is to provide a movable scale beam actuated by the load in combination with power driven means for intermittently locking said beam against movement under the influence of the load, and means comprising power driven rotating cams located on opposite sides of a part of said beam for engaging said part while said beam is locked against movement and causing the position of said beam to be periodically recorded by suitable mechanism. Another object of the invention is to provide an improved weighing scale comprising novel means for indicating the weight on the scale and also, preferably, novel means for computing and indicating the price of the goods weighed. Other objects relate to various features of construction and arrangement which will appear more fully hereinafter.

The nature of the invention will be understood from the following specification taken with the accompanying drawings, in which one embodiment is illustrated. In the drawings, Fig. 1 shows a side elevation of the improved scale with portions of the casing broken away to show the relation of the weighing mechanism to the recording and computing mechanism;

Fig. 5 shows a vertical section taken on the line 5—5 of Fig. 3;

Fig. 6 shows a vertical section on the line 6—6 of Fig. 3;

Fig. 7 shows an enlarged horizontal section taken on the line 7—7 of Fig. 3;

Fig. 8 shows a vertical section taken on the line 8—8 of Fig. 7;

Figure 1:
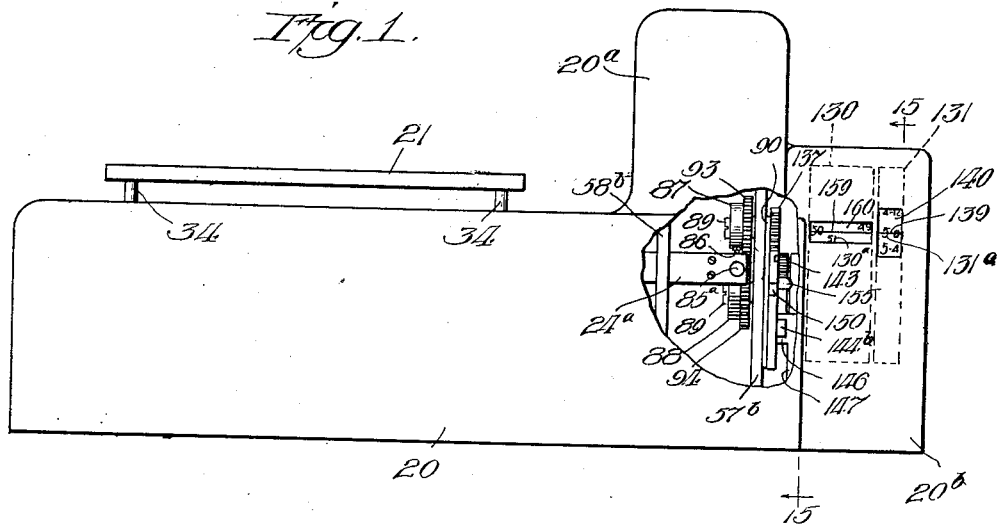

Fig. 9 shows a vertical section taken on the line 9—9 of Fig. 7, showing in elevation the rotating cams by which the member which actuates the recording mchanism is periodically adjusted to a new position corresponding with the load on the scale, at times when the scale beam is locked against movement, the relation of the parts being that which they occupy when the scale beam is free to move under the influence of the load;

Fig. 10 is a sectional view like that of Fig. 9, except that the scale beam is shown as being locked against movement and the lower one of the pair of rotating cams is engaging a pin carried by the beam to effect a downward movement of the member by which the recording mechanism is actuated to indicate the load on the scale;

Fig. 11 is a view similar to those of Figs. 9 and 10 but showing the relative positions after further movement of the cams and after a corresponding downward movement of the member which actuates the indicating or recording mechanism;

Fig. 12 shows an enlarged vertical section similar to that of the right-hand portion of Fig. 9, with the scale being locked against movement, illustrating the relation to the pin carried by the scale beam of the rotating positioning cams when the pin is first engaged by the upper cam;

Fig. 13 is a view similar to that of the upper part of Fig. 12, showing the relative positions of the parts after further rotation of the cams, wherein the member which actuates the recording mechanism has been elevated by the rotation of the inner portion of the upper cam while the outer portion of the upper cam has remained stationary in contact with the pin, and preliminary to the engagement with the pin of the lower positioning cam;

Fig. 14 is a view similar to that of Fig. 13, showing the relative positions of the parts after the outer portion of the upper cam has been turned out of engagement with the pin by the action of its spring, while the continued rotation of the lower cam is about to bring it into engagement with the under side of the pin;

Fig. 15 is a vertical section taken on the line 15—15 of Fig. 1, showing the actuating and recording mechanism in elevation;

Fig. 16 is a detail section taken on the line 16—16 of Fig. 15;

Fig. 17 is a vertical section taken on the line 17—17 of Fig. 15; and

Fig. 18 shows an enlarged side elevation of the rotating drums of the indicating and recording mechanism.

Figure 2:
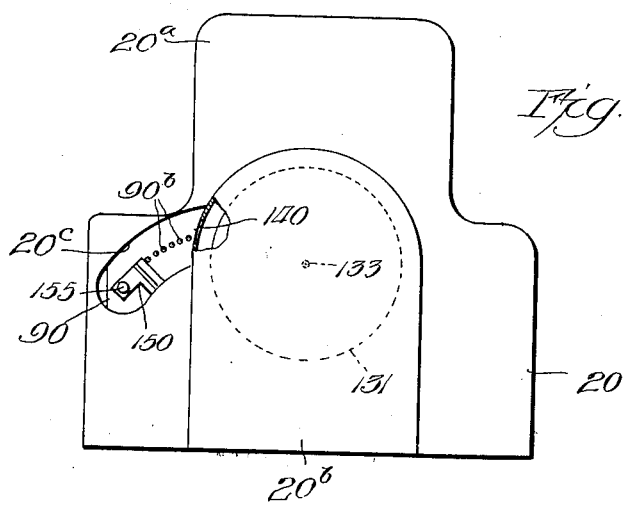
Fig. 2 shows an end elevation of the scale illustrated in Fig. 1.
Figure 3:
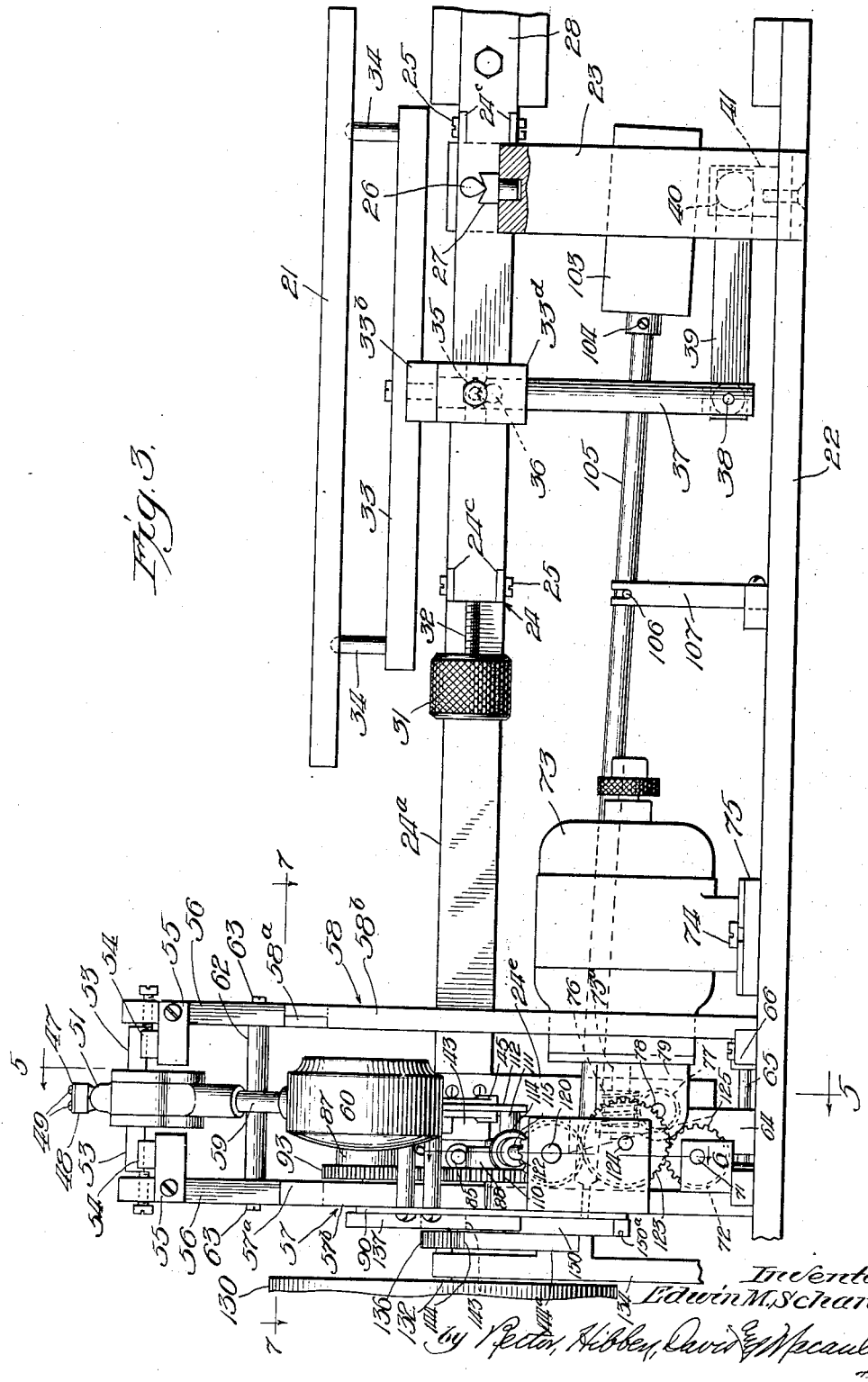
Fig. 3 shows an enlarged side elevation of the weighing mechanism of the scale the casing being removed.
Figure 4:
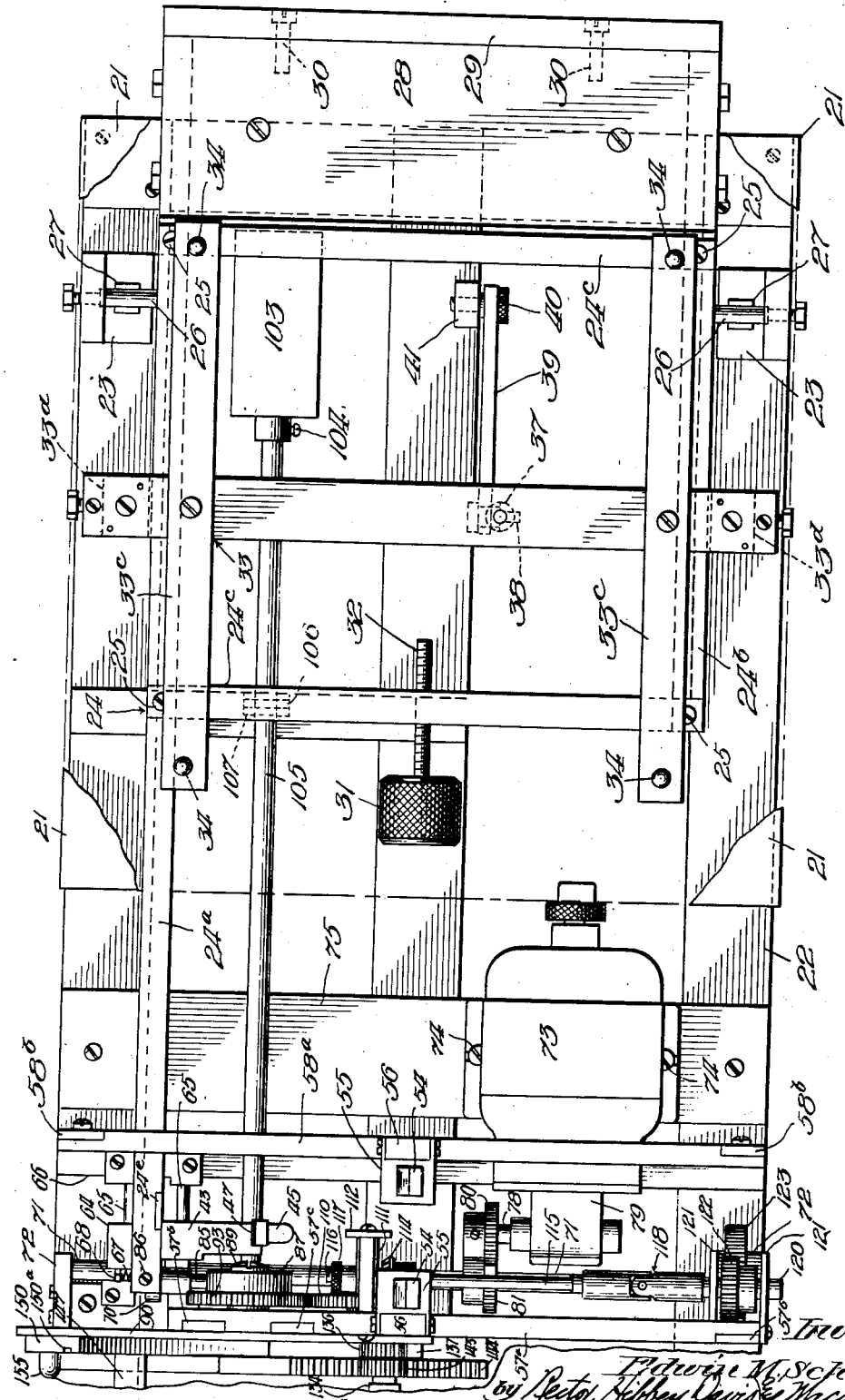
Fig. 4 shows a top plan view of the improved weighing mechanism illustrated in Fig. 3.

As shown in Figs. 1 and 2, the improved scale of the present invention is illustrated as comprising a casing 20 adapted to rest upon a table or other support and having housed within the body portion thereof a weighing mechanism which is actuated by the load placed upon the pan or tray 21 located above the body portion of the casing. In one end of this casing there is mounted the mechanism for periodically locking the weighing mechanism against movement and for actuating the member by which the position of the weighing beam is periodically recorded, a portion of this mechanism being located in an upper extension 20ᵃ of the casing. The casing also includes at the end thereof adjacent the part 20ᵃ a horizontal extension 20ᵇ in which is located the indicating and computing mechanism of the scale. The casing 20 and the scale mechanism are carried by a base 22 which is secured within the outer walls of the casing and which has extending upwardly therefrom a pair of posts or standards 23 adapted to support the scale beam 24 which comprises a longitudinal member 24ᵃ located adjacent one side of the casing and having secured thereto a rectangular lateral extension comprising a parallel longitudinal member 24ᵇ and transverse end members 24ᶜ which are secured to these parallel members by studs 25. The side members of the beam carry projecting knife edge pins or bearing members 26 which are adapted to rock upon the knife edge bearings 27 carried by the posts 23. At the right hand end, as viewed in Fig. 3, the beam carries plates 28 and 29 which are secured in place by screws 30 and which are adapted to serve as a counterweight for properly balancing the beam on its bearings when there is no load on the scale. On the other side of the knife edge bearings, there is mounted an adjustable counterweight 31 carried by a rod 32 which threadedly engages a transverse member of the beam, as shown in Fig. 4, so that it may be adjusted longitudinally to regulate the initial balance of the beam and the zero position of the indicating or recording device which is actuated by the beam. Above the rectangular lateral extension of the beam 24, there is mounted a platform 33 made up of transverse end frame members 33ᵃ, an intermediate transverse member 33ᵇ and parallel side members 33ᶜ. The side members 33ᶜ carry four upwardly extending pins 34, the upper ends of which engage recesses in the under side of the pan or tray 21 upon which the load to be weighed is placed. The intermediate transverse member 33ᵇ of the platform projects beyond the side members 33ᶜ and these projecting ends carry downward extensions or housings 33ᵈ adapted to enclose and support the knife edge bearings 35 which rest upon the knife edge members 36 secured to and projecting laterally from the parallel side members of the beam 24. The platform 33 thus has a knife edge support upon the beam and to maintain the platform 33 in a stable position on these bearings, a downwardly extending arm 37 is secured to an intermediate part of the transverse member 33ᵇ of the platform and this arm is pivoted at 38 to a horizontally extending link 39 having a pivotal connection through a pin 40 with a block 41 attached to the base 22.

Since the knife edge bearings 35, 36 are displaced endwise of the beam from the knife edge bearings 26, 27, a load placed upon the pan or tray will cause the beam 24 to swing downwardly about the knife edge bearings 27. This downward movement is opposed by counterbalancing mechanism illustrated particularly in Fig. 5, where it is shown as being connected to a block 43 attached to the end of the beam 24ᵃ by means of a screw 44 which clamps the reduced extremity 43ᵃ of the block within an aperture formed in the beam. The block 43 is provided with a flange 43ᵇ which extends into the notch 45ᵃ of a bracket 45. The flange 43ᵇ is engaged on its upper and lower sides by adjustable clamping pins 46 and the motion of the beam 24 is thus transmitted through the bracket 45 to a strap 47 which extends over the arcuate surface of a sector 48 with its upper end secured by a screw 49 to the upper edge of the sector. The sector is pivoted at 50 on a member 51 with respect to which it is capable of relative angular adjustment by means of screws 52. The member 51 carries knife edges 53 which rest upon the knife edge bearings 54 carried by blocks 55 which are in turn supported by posts 56 extending upwardly from the upper transverse frame members 57ᵃ and 58ᵃ of vertical frames 57 and 58, respectively, which comprise vertical frame members 57ᵇ and 58ᵇ extending upwardly from and secured to the base 22, as shown in Figs. 3 and 5. The posts 56 are spaced apart by a rod 62 which is secured to them by studs 63. The member 51 which is thus supported by the knife edge bearings on the frame member 55, carries an arm 59 having a weight 60 secured to the lower end thereof. With this arrangement, the downward movement of the beam 24 under the influence of the load on the tray 21 causes the weight 60 to be elevated by the downward pull of the strap 47. When there is no weight on the scale, the weight 60 is suspended approaching a vertical plane passing through the knife edge bearings 53, 54, but, as the load on the pan is increased, the arm 59 of the weight 60 swings upwardly toward a horizontal position with the result that the force required to elevate the weight gradually increases. The counterbalancing effect of the weight 60 is thus made proportional to the weight on the pan or tray 21 to such an extent that the movements of the extremity of the beam 24 are proportional to the load.

Instead of transmitting the motion of the beam directly and causing the indicating and recording mechanism to be actuated, in whole or in part, by the energy of the moving beam, as in the prior practice, the present invention provides a mechanism for periodically locking the beam 24 against movement as it descends under the influence of the load. For the purpose of effecting this locking action, the main longitudinal member of the beam 24 is provided adjacent its extremity with a downwardly extending arm 24$^e$ adapted to be engaged on its opposite sides by a pair of locking levers 64, as shown in Figs. 8, 9, 10, 11 and 12. These locking levers are pivoted at 65 between transverse members 66 carried by the base 22 and they are provided at their upper extremities with disks 64$^a$, of brass or the like, which are adapted to engage the opposite flat faces of the arm 24$^e$ to hold the beam against movement. The upper ends of these levers are connected by a coil spring 67 which is connected thereto by pins 68 and this spring acts normally to force the disks of the locking levers into engagement with the side faces of the arm 24$^e$. The upper ends of the locking levers 64 are periodically moved out of engagement with the arm 24$^e$ by means of a continuously rotating cam or disk 70 which is mounted upon a horizontal shaft 71 journaled in bearing members 72 carried by the base 22. The cam or disk 70 has pins 70$^a$ projecting from opposite sides thereof in alignment with each other and these pins are rounded at their outer ends so that they are adapted to act as cams in engaging the edges 64$^b$ of the locking levers and thus wedge the levers apart as the cam rotates. After passing over the edges 64$^b$ which have a normal spaced relation less than the distance between the outer ends of the pins 70$^a$, as shown in Fig. 12, the pins are adapted to pass through the notches 64$^c$ of the locking levers, whereupon the disks 64$^a$ of the levers are again forced into gripping engagement with the arm 24$^e$ by the action of the spring 67. The arm 24$^e$ of the beam is thus gripped and released once during each rotation of the cam 70 which, although occupying a definite position on the shaft 71, is preferably permitted to have a slight lateral rocking motion which will permit it to adjust itself to the locking levers 64 in such a manner that the two disks 64$^a$ carried by these levers will always engage opposite sides of the arm 24$^e$ at the same time. The shaft 71 is adapted to be driven by an electric motor 73, shown in Figs. 3 and 4, which has its frame secured by screws 74 upon a transverse member 75 of the base 22. The motor shaft 73$^a$ has mounted thereon a worm 76 arranged to mesh with a worm wheel 77 fixed on a shaft 78 within a housing 79 extending endwise from the motor casing, as shown in Figs. 4 and 5. The shaft 78 has a gear 80 secured thereon to mesh with another gear 81 fixed on the shaft 71, previously referred to, so that when the motor 53 is in operation, the shaft 71 and the cam 70 are continuously operated to effect an intermittent gripping of the scale beam 24.

During each interval that the beam 24 is locked in stationary position by the locking levers 64, the position of the beam is measured by the position-recording mechanism of the present invention and these successive measurements result in the movement of an actuating member which is proportional to the load on the beam so that the movement of this actuating member may be transmitted to the indicating and computing mechanism of the scale to indicate or record the weight being measured. For the purpose of making these successive determinations of the position of the beam 24, the free end of the beam is provided with a laterally projecting pin 85, shown in Figs. 8 to 14 inclusive, which has a reduced extremity 85$^a$ engaging an aperture in the beam where it is secured in place by a set screw 86. The pin 85 is adapted to be engaged successively on opposite sides by two continuously rotating cams 87 and 88 which are rotatably mounted upon stub shafts 89 mounted in a vertically movable bar 90$^a$ constituting a part of the actuating member 90, the body portion of which is in the form of a rectangular plate secured to the bar 90$^a$ by means of screws 91. The bar 90$^a$ has a dovetail sliding engagement with one of the lateral vertical frame members 57$^b$ of the frame 57 and with an adjacent parallel frame member 57$^c$, shown in Figs. 5, 7 and 8. The cams 87 and 88 are adapted to be rotated in the directions indicated by the arrows 92, in Fig. 12, through the operation of intermeshing gears 93 and 94 which revolve on the shafts 89. The lower gear 94 is secured to the cam 88 by a key or the like and the upper gear 93 is formed integrally with an inner cam 87$^a$ which forms a complementary part of the upper cam 87. The cam 87$^a$ revolves in an eccentrically located aperture formed in the outer portion 87$^b$ of the cam which is provided with an arcuate slot 87$^c$ engaged by a pin 95 projecting from the face of the adjacent gear 93. The end of this pin is connected by a coil spring 96 with another pin 97 projecting from the outer cam portion 87$^b$ and the parts normally occupy the relative positions shown in Fig. 7. When the outer portion 87$^b$ of the cam engages the upper side of the pin 85 carried by the beam 24, the two portions of the cam 87 are adapted to have relative rotative movement, as hereinafter more fully explained. In order that the actuating member 90 may be always brought to its final position by the coaction of the same members, the apparatus is so arranged that the cam 88 engages the under side of the pin 85 after the pin has been engaged on its upper side by the cam 87 and these successive engagements of the cams with the pin are adapted to effect a vertical adjustment of the actuating member 90 to a position corresponding to the weight on the scale. In order to hold the actuating member 90 in adjusted position, a pin 98 is secured to one side of this member, as shown in Fig. 13, and a member 99 is mounted on this plate and arranged to carry a reversely bent leaf spring 100 which bears against one edge of the intermediate vertical frame member 57$^c$. The member 99 may be adjusted angularly about the pin 98 to vary the pressure of the spring on the frame member and it may be secured in adjusted position by a set screw 101.

The movement of the actuating member 90 is adapted to be counterbalanced by a weight 103, shown in Fig. 3, which is adjustably mounted by means of a set screw 104 upon the end of a lever 105 which is pivoted at 106 on a standard 107 extending upwardly from the base 22. The other end of this lever has engagement with an aperture formed in the lower part of the actuating member 90 so that the weight of the member 90 and parts carried thereby is counterbalanced in such a manner that the vertical adjustment of the actuating member may be effected with a minimum expenditure of energy. The power for rotating the cams 87 and 88 and thereby causing the actuating member 90 to assume a position corresponding to the position of the pin 85 carried by the scale beam is applied through a gear 110 which meshes with the gear 94, as shown in Figs. 5 and 7, and which is mounted to revolve about a shaft 111 having its ends journaled in the actuating member 90 and in a bracket 112 secured to and having a part spaced outwardly from the member 90. The gear 110 has a bevel gear 113 secured to the face thereof and arranged to mesh with another bevel gear 114 fixed upon a power transmitting shaft 115. The shaft 115 is provided at its upper end with a reduced portion 116 which extends through an aperture in the stationary shaft 111, as shown in Fig. 6. The member 116 is threaded for engagement by a nut 117 which has the outer portion thereof knurled so that it may be turned by the fingers of the operator. The other end of the shaft 115 is connected through a universal joint 118 with a horizontal shaft 120 which has a sliding and rotative engagement with bearing plates 121 which are secured to the adjacent vertical frame member 57$^b$. Between these bearing plates, a gear 122 is splined on the shaft 120 and this gear meshes with an intermediate gear 123 mounted to revolve about a shaft 124 carried by the bearing plates 121 and arranged to mesh with a gear 125 fixed upon the previously described shaft 71. With this arrangement, the shaft 71, which is driven continuously by the motor 73, causes a continuous rotation of the shaft 115 and the sliding engagement of the shaft 120 with the gear 122 permits such longitudinal movement of the shaft 120 as may be necessary to allow the shaft 115 to adjust itself to different vertical positions of the actuating member 90, the universal joint 118 permitting continuous rotation of the shaft 115 in all of these positions.

The vertical movement of the actuating member 90 which takes place in response to the engagement of the cams 87 and 88 with the pin 85 on the scale beam, is adapted to actuate the computing and indicating mechanism which is illustrated particularly in Figs. 1, 7, 8, 15, 16, 17 and 18. This mechanism comprises a price indicating drum 130 and a weight indicating drum 131 which are mounted side by side in the extension 20$^b$ of the casing. The drum 130 is fixed on a hollow shaft 132 which is mounted to revolve on the telescoping shaft 133 on which the drum 131 is fixed. The shaft 132 is journaled in a standard 134 extending upwardly from the base 22 and the outer end of the shaft 133 is journaled in another standard 135 extending upwardly from the base. The shaft 133 which actuates the weight indicating drum 131 has a pinion 136 fixed on the inner end thereof to mesh with a rack bar 137 which is secured to the actuating member 90 so that as the actuating member is moved vertically in response to changes in the position assumed by the pin 85 on the scale beam 24, the drum 131 is rotated to indicate the weight on the pan 21. The drum 130 is provided on its outer side with graduations 130$^a$ which are arranged in diagonal rows spaced apart so that a large number of graduations may be placed upon a drum of moderate diameter. The weight on the pan is indicated by the registration of a particular graduation on the drum 131 with a stationary index mark 139, which may be a hair line on a transparent plate 140 mounted in an aperture in the casing extension 20$^b$.

In order to indicate on the drum 130 the price at which the commodity on the scale pan 21 is to be sold, the drum 130 is arranged to be actuated by a pinion 143 mounted on the end of the shaft 133 and arranged to mesh with a horizontal rack bar 144 which is constructed in the form of a rectangular frame having a lower arm 144$^a$ which slides in a guideway 145 carried by the post 134 and a horizontal extension 144$^b$ which slides in a guideway 146 carried by another post 147 secured to the base 22. A price computing arm 150 is pivotally mounted upon a stud 151 carried by the lower part of the actuating member 90, as shown in Figs. 8 and 15, and this arm is provided with a longitudinal groove 150$^a$ engaged by a pin 152 secured to the extension 144$^b$ of the sliding rack bar 144. Adjacent the upper end of the arm 150, the actuating member 90 is provided with a series of holes 90$^b$ which are arranged in an arc having its center coincident with the axis of the pin 151 upon which the arm 150 is mounted. The upper end of the arm 150 is provided with a lateral extension 150$^b$ provided with an aperture 150$^c$ in which is mounted a ball 154 adapted to engage one of the apertures 90$^b$ in the actuating member when the computing arm 150 is properly positioned. A handle 155 is mounted in the enlarged end of the aperture 150$^c$ and this handle is provided with a socket in which is located a coil spring 156 adapted to press the ball 154 into engagement with one of the holes 90$^b$. The actuating member 90 is provided with a series of graduations 157 each of which is located in registry with one of the apertures 90$^b$ and these graduations may represent the price per pound, for example, at which the goods on the pan 21 are to be sold. At the commencement of the weighing operation, the computing arm 150 is turned until the handle 155 is in registry with the price of the goods, whereupon the ball 154 engages the registering aperture 90$^b$ and holds the arm 150 against movement. Then, when the actuating member 90 is moved vertically to turn the drum 131 and thereby indicate the weight of the goods with reference to the index mark 139, the pin 152, engaging the groove 150$^a$ in the computing arm, causes the rack bar 144 to move horizontally, thereby turning the shaft of the drum 130. This drum is provided on its periphery with graduations 130$^a$ and one of these graduations is brought into registry with an index line 159 carried by a transparent plate 160 which is mounted in an aperture in the extension 20$^b$ of the casing. The parts are so graduated that the horizontal movement of the rack bar 144, with the computing arm 150 set in the proper position, will cause a graduation 130$^a$ to be brought into registry with the index mark 159 which will indicate the total price of the goods whose weight is indicated by the position of one of the graduations 131$^a$ with respect to the other index mark 139. As shown in Fig. 2, the end wall of the casing 20 is provided with an arcuate slot 20$^c$ which permits access to the handle 155 by which the computing arm 150 is adjusted. The ball 154 engages in one of the apertures 90$^b$ with sufficient pressure to hold the arm 150 against angular movement during the vertical movement of the actuating member 90 but when a manually applied pressure is exerted on the handle 155, the ball 154 will pass out of the aperture 90ᵇ engaged thereby and will ride over the face of the actuating member 90 until the new selected position of the computing arm is reached, whereupon the ball will pass into engagement with another hole 90ᵇ.

Assuming that there is no load on the pan 21 of the scale and that the arm 24ᵉ of the scale beam is released by the locking levers 64, as shown in Fig. 9, the counterbalances cause the beam to occupy its normal or zero position, and the actuating member 90 is in the upper position shown in Fig. 9 with the upper cam 87 engaging the pin 85. If a load be then placed on the pan 21, the beam 24 will move downwardly and carry with it the cams 87 and 88 and the actuating member 90, the arm 24ᵉ moving freely between the locking levers 64 when these levers are separated, as shown in Fig. 9. The next time that the arm 24ᵉ is locked by the levers 64, the parts may occupy the relative positions shown in Fig. 10, wherein the scale beam 24 and the positioning pin 95 are lowered by the effect of the weight. This has also caused a lowering of the actuating member 90 and the pin 85 is shown as being engaged by the lower cam 88 while the upper cam is spaced a considerable distance therefrom. In Fig. 11, the scale beam 24 is still locked in stationary position but the cam 88 has continued its rotation and has effected a still further depression of the actuating member 90 due to the coaction of the cam with the under side of the pin 85. The action of the two cams 87 and 88 in engaging the pin 85 and effecting an adjustment of the actuating member 90 to correspond with the load on the scale beam, is illustrated somewhat more clearly in Figs. 12, 13 and 14. In Fig. 12, the scale beam 24 is shown as being locked in stationary position by the locking levers 64 and the upper cam 87 is in engagement with the pin 85 while the lower cam 88 is a considerable distance below the pin. As soon as the outer portion 87ᵇ of the cam 87 engages the pin 85, the frictional contact causes this portion of the cam to remain stationary in contact with the pin, while the inner portion 87ᵃ of the cam continues its relative rotation with a resulting elongation of the spring 96. This continues until the parts reach the relative positions shown in Fig. 13, during which time the lower cam 88 will have continued its rotation and will be near the under side of the pin 85. At this point, and before the lower cam 88 engages the pin 85, the elongation of the spring 96 will have reached its limit, due to the engagement of the pin 95 with the other end of the slot 87ᶜ in the outer portion of the cam and the continuously rotating gear 93 then causes the outer portion 87ᵇ of the cam 87 to turn quickly from the position shown in Fig. 13 to the position shown in Fig. 14. The pin 85 is then released by the upper cam 87 but is about to be engaged by the lower cam 88 which then effects a final positioning of the actuating member 90 to correspond with the position then occupied by the scale beam 24. In this way, the final positioning of the actuating member, each time that the scale beam is locked in stationary position by the locking lever 64, is effected always by the lower cam 88, following an initial positioning by the upper cam 87 which, by reason of the action of the relatively movable parts of this cam, is maintained until the lower cam is about to engage the under side of the positioning pin. This positioning of the actuating member 90 takes place each time that the scale beam 24 is locked in stationary position with the result that the drums 131 are gradually moved to a final position indicating the weight and price, respectively, of the goods on the scale pan, the final positions assumed by the drums with respect to the stationary index marks 139 and 159 being those corresponding with the position of equilibrium assumed by the scale beam 24 under the influence of its load. The actuation of the mechanism for locking the scale beam and the mechanism for moving the actuating member 90 and adjusting the positions of the drums 130 and 131 is effected entirely by power supplied through the electric motor 73 so that the weighing, recording and computing operations are effected without consuming any of the energy of the load on the scale pan.

Although one form of the invention has been shown and described by way of illustration, it will be understood that it may be constructed in various other embodiments coming within the scope of the appended claims.

I claim:

1. The combination in weighing scales, of a member movable in proportion to the load on the scale, means for periodically holding said member in any of various positions assumed by said member during the determination of the weight of a load, and means actuated independently of said load for indicating the position of said member each time it is so held.

2. The combination in weighing scales, of a member movable in proportion to the load on the scale, means actuated independently of said load for intermittently locking said member in any of various positions assumed by said member during the determination of the weight of a load, and load indicating means independently movable to a position responsive to the position of said member while it is held in such positions.

3. The combination in weighing scales, of a member movable in proportion to the load on the scale, means actuated independently of said load for intermittently locking said member in any of various positions assumed by said member during the determination of the weight of a load, and load indicating means responsive to the position of said member while it is so locked, said load indicating means being actuated independently of said load.

4. The combination in weighing scales, of a member movable proportional to the load on the scale, means actuated independently of the load for periodically locking said member in any of various positions assumed by said member as said member moves to a position of equilibrium determined by said load, and load indicating means actuated independently of said load but responsive to the position of said member each time said member is so locked.

5. The combination in weighing scales, of a member movable in proportion to the load on the scale, means actuated independently of said load for intermittently locking said member in any of various positions assumed by said member during the determination of the weight of a load, and power driven load indicating means responsive to the position of said member while it is so locked for indicating the load on the scales.

6. The combination in weighing scales, of a member movable in proportion to the load on the scale, means for periodically locking said member in any of various positions assumed by said member during the determination of the weight of a load, and continuously actuated power driven means for engaging and recording the position of said member each time it is so locked.

7. The combination in weighing scales, of a member movable in proportion to the load on the scale, means for periodically locking said member in any of various positions assumed by said member during the determination of the weight of a load, and means comprising a continuously actuated power driven cam for periodically engaging said member for recording the position of said member each time it is so locked.

8. The combination in weighing scales, of a member movable in proportion to the load on the scale, means for periodically locking said member in stationary position, and means comprising a pair of continuously actuated power driven cams periodically engaging opposite sides of said member for recording the position of said member each time it is held stationary.

9. The combination in weighing scales, of a member movable in proportion to the load on the scale, means for periodically locking said member in stationary position, and means comprising a pair of continuously rotating power driven cams engaging opposite sides of said member in succession for recording the position of said member each time it is held stationary.

10. The combination in weighing scales, of a member movable in proportion to the load on the scale, means for periodically locking said member in stationary position, and means comprising a pair of continuously actuated power driven cams periodically engaging opposite sides of said member for recording the position of said member each time it is held stationary, one of said cams comprising inner and outer parts having relatively angular movement adapted to permit the outer part to have a predetermined period of engagement with said member.

11. The combination in weighing scales, of a member movable in proportion to the load on the scale, means for periodically locking said member in stationary position, and means comprising a pair of continuously actuated power driven cams periodically engaging opposite sides of said member for recording the position of said member each time it is held stationary, one of said cams comprising inner and outer parts having relatively angular movement adapted to permit the outer part to have a predetermined period of engagement with said member while permitting continued rotation of the inner part, and resilient means for restoring said outer part to its initial position with respect to said inner part at the end of said period.

12. The combination in weighing scales, of means for supporting a load, a positioning member movable in proportion to said load, means for periodically locking said positioning member in any of various positions assumed by said member during the determination of the weight of a load, an actuating member, means carried by said actuating member for periodically engaging said positioning member while it is so locked, and indicating means operated by said actuating member.

13. The combination in weighing scales, of means for supporting a load, a positioning member movable in proportion to said load, means for periodically locking said positioning member against movement, an actuating member, power driven rotatable cams carried by said actuating member to engage said positioning member when said positioning member is held in stationary position, and indicating means actuated by said positioning member.

14. The combination in weighing scales, of a load carrying beam having movement proportional to the load thereon, means for periodically locking said beam in stationary position, a motor for actuating said locking means, a movable actuating member, a positioning member carried by said beam, a rotating member mounted on said actuating member and adapted to engage said positioning member when said beam is held stationary to effect movement of said actuating member, and means driven by said motor for operating said rotating member.

15. The combination in weighing scales, of a load carrying beam having movement proportional to the load thereon, means for periodically locking said beam in stationary position, a motor for actuating said locking means, a movable actuating member, a positioning member carried by said beam, a rotating member mounted on said actuating member and adapted to engage said positioning member when said beam is held stationary to effect movement of said actuating member, means driven by said motor for operating said rotating member, and indicating means operated by the movement of said actuating member.

16. The combination in weighing scales, of a load carrying beam movable in proportion to the load thereon, means for periodically locking said beam in stationary position, a positioning member carried by said beam, a slidably mounted actuating member, a pair of rotatable cams mounted on said actuating member and adapted to engage opposite sides of said positioning member when said beam is held stationary, a motor, and a flexible driving connection from said motor to said cams to permit the operation of said cams in any position of said actuating member.

17. The combination in weighing scales, of a load carrying beam movable in proportion to the load thereon, means for periodically locking said beam in stationary position, a positioning member carried by said beam, a slidably mounted actuating member, a pair of rotatable cams mounted on said actuating member and adapted to engage opposite sides of said positioning member when said beam is held stationary, a motor, a flexible driving connection from said motor to said cams to permit the operation of said cams in any position of said actuating member, and weight indicating means actuated by the movement of said actuating member.

18. The combination in weighing scales, of means for supporting a load, an indicating device, a slidably mounted operating member for operating said device, an actuating member having movement transversely to the path of movement of said operating member, adjustable means for connecting said operating member and said actuating member to effect the operation of said operating member by said actuating member, means for setting said adjustable connecting means according to the price of the goods being weighed, and means for moving said actuating member in proportion to the load on the scales.

19. The combination in weighing scales, of means for supporting a load, an indicating device, a slidably mounted operating member for operating said device, an actuating member having movement transversely to the path of movement of said operating member, an arm pivoted on said actuating member and adapted to be adjusted to an angular position corresponding to the price of the goods being weighed, said arm being provided with a longitudinal slot, a pin carried by said operating member and engaging said slot, and means for moving said actuating member in proportion to the load on the scales.

20. Weighing apparatus of the character described comprising, in combination, load-counterbalancing mechanism adapted to oscillate upon the application of a load, braking means adapted to engage the mechanism for temporarily arresting its oscillation, power-driven means for operating the braking means intermittently to release the mechanism during successive periods of a predetermined uniform length, indicating means normally disconnected from the mechanism, and means for operatively connecting the indicating means with the mechanism is an interval during which the mechanism is arrested by the braking means.

EDWIN M. SCHANTZ.